(12) United States Patent
Uthaman et al.

(10) Patent No.: US 11,550,800 B1
(45) Date of Patent: Jan. 10, 2023

(54) LOW LATENCY QUERY PROCESSING AND DATA RETRIEVAL AT THE EDGE

(71) Applicant: Amazon Technologies, Inc., Seattle, WA (US)

(72) Inventors: Karthik Uthaman, Seattle, WA (US); Ted David Middleton, Fall City, WA (US); Ronil Sudhir Mokashi, Mercer Island, WA (US); Prashant Verma, Seattle, WA (US); Alexander Korobeynikov, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 17/039,992

(22) Filed: Sep. 30, 2020

(51) Int. Cl.
*G06F 16/2458* (2019.01)
*G06F 16/2452* (2019.01)

(52) U.S. Cl.
CPC ...... *G06F 16/2471* (2019.01); *G06F 16/2452* (2019.01)

(58) Field of Classification Search
USPC .......................................................... 707/760
See application file for complete search history.

(56) References Cited

U.S. PATENT DOCUMENTS

| | | | | |
|---|---|---|---|---|
| 5,634,053 | A * | 5/1997 | Noble | G06F 16/256 707/999.009 |
| 5,933,837 | A * | 8/1999 | Kung | G06F 16/2471 707/999.001 |
| 6,236,997 | B1 * | 5/2001 | Bodamer | G06F 16/258 |
| 6,704,726 | B1 * | 3/2004 | Amouroux | G06F 16/24524 |
| 6,901,403 | B1 * | 5/2005 | Bata | G06F 16/26 |
| 9,141,669 | B2 | 9/2015 | Jellick et al. | |
| 9,348,880 | B1 * | 5/2016 | Kramer | G06F 16/258 |
| 9,516,136 | B2 | 12/2016 | Newton et al. | |
| 9,824,128 | B1 * | 11/2017 | Maluf | G06F 8/24 |
| 10,270,817 | B2 | 4/2019 | Weihl et al. | |
| 10,805,652 | B1 | 10/2020 | Uthaman et al. | |
| 2002/0055932 | A1 * | 5/2002 | Wheeler | G06F 16/25 |
| 2002/0165853 | A1 * | 11/2002 | Gogolak | G06F 16/284 |
| 2006/0026154 | A1 | 2/2006 | Altinel et al. | |

(Continued)

OTHER PUBLICATIONS

U.S. Appl. No. 17/039,995, filed Sep. 30, 2020, Karthik Uthaman, et al.

(Continued)

*Primary Examiner* — Cam Linh T Nguyen
(74) *Attorney, Agent, or Firm* — Robert C. Kowert; Kowert, Hood, Munyon, Rankin & Goetzel, P.C.

(57) ABSTRACT

A datastore engine at an edge location of a content delivery network (CDN) may perform low-latency query processing and data retrieval for multiple types of databases at one or more origin servers. When a client sends a query to the edge location, the datastore engine translates the query from a back-end database format into a native format of the local edge datastore. If the requested data is not there, then the datastore engine retrieves the data from the back-end table and inserted inserts the data into the local edge datastore. By using multiple queries over time to re-construct data from the backend database tables at the edge, the datastore engine may provide low-latency access to data from the backend database tables (avoiding the need to retrieve data from the back-end tables to serve subsequent queries).

20 Claims, 17 Drawing Sheets

(56) References Cited

U.S. PATENT DOCUMENTS

| | | | |
|---|---|---|---|
| 2008/0184264 A1* | 7/2008 | Gatti | G06F 9/465 |
| | | | 719/316 |
| 2011/0225417 A1 | 9/2011 | Maharajh et al. | |
| 2013/0311548 A1 | 11/2013 | Huang et al. | |
| 2014/0149552 A1 | 5/2014 | Carney et al. | |
| 2014/0207818 A1 | 7/2014 | Jellick et al. | |
| 2014/0280248 A1 | 9/2014 | Bester | |
| 2014/0280259 A1* | 9/2014 | McGillin | G06F 16/2452 |
| | | | 707/756 |
| 2016/0041997 A1* | 2/2016 | Gokhale | G06F 16/245 |
| | | | 707/694 |
| 2016/0232235 A1* | 8/2016 | Palko | G06F 16/2471 |
| 2016/0366055 A1 | 12/2016 | Leach | |
| 2017/0026338 A1 | 1/2017 | Leach et al. | |
| 2017/0364450 A1 | 12/2017 | Struttmann | |
| 2019/0102415 A1 | 4/2019 | Bishnoi | |
| 2019/0340291 A1* | 11/2019 | Raman | H04L 47/762 |
| 2020/0220746 A1 | 7/2020 | Shribman et al. | |
| 2021/0109936 A1 | 4/2021 | Sun et al. | |
| 2021/0173888 A1 | 6/2021 | Flack et al. | |

OTHER PUBLICATIONS

U.S. Appl. No. 17/039,994, filed Sep. 30, 2020, Karthik Uthaman, et al.

* cited by examiner

```
TableName: "Pets",
ID: "DatabaseA:us-east-1:12312313:table/Pets",
"Key": {
    "AnimalType": {"S": "Dog"},
}
```
Query to Target Database *702*

```
{
    "Item": {
        "Colors": {
            "L": [
                {"S": "White"},
                {"S": "Brown"},
                {"S": "Black"}
            ]
        },
        "Name": {"S": "Fido"},
        "Breed": {"S": "Beagle"},
        "AnimalType": {"S": "Dog"}
    },
    "Item": {
        "Colors": {
            "L": [
                {"S": "Brown"},
                {"S": "Black"}
            ]
        },
        "Name": {"S": "Mark"},
        "Breed": {"S": "Poodle"},
        "AnimalType": {"S": "Dog"}
    },
}
```
Response From Target Database *704*

*FIG. 7A*

| Pets (key-value object) 706 | | | |
|---|---|---|---|
| Name | Breed | Animal Type | Colors |
| Fido | Beagle | Dog | [White, Brown, Black] |
| Mark | Poodle | Dog | [Brown, Black] |

Insert "Pets" object into the Edge Datastore

| Edge Datastore (in-memory database) 708 | |
|---|---|
| Datastore Key | Datastore Binary DB |
| D123.REDIRECT_RULES | 0xa12cf01... |
| D123.CDN_RULES | 0xa12a901... |
| D345.PETS | 0xab2109a... |

FIG. 7B

*Function Specification*

Triggering Event
- ▶ Viewer Request
- Viewer Response

Function Identifier | FunctionA

*Datastores*

| Datastore Name | Datastore Type | Size | |
|---|---|---|---|
| DS_LOCAL_RULES_RW | Local Read/Write Datastore | 5 MB | |

| Datastore Name | Datastore Type | Size | Source Database/Table Identifier | Filter |
|---|---|---|---|---|
| DS_REDIRECT_RULES | Clone Remote Datastore (Read-Only) | Size in MB | DatabaseA:tableX | |

| Datastore Name | Datastore Type | Size | Source Database/Table Identifier | Filter |
|---|---|---|---|---|
| DS_REMOTE_RULES_RW | Clone Remote Datastore with Local Writes | 5 MB | DatabaseZ:tableQ | PRIMARY_ |

*FIG. 10*

LOW LATENCY QUERY PROCESSING AND DATA RETRIEVAL AT THE EDGE

BACKGROUND

Content delivery networks (CDNs) often use data centers at different geographic locations (referred to herein as "points of presence" (POPs) or "edge locations") to deliver content to clients. A CDN may set up edge locations in different geographical locations that are physically close to clients in order to provide faster responses for content that is requested by the clients. When a client requests data from the CDN (e.g., via a web browser or other application), the requested data may be retrieved from an origin database, provided to the client, and stored at the edge location for quick data retrieval if the same request is made for the same data. However, different client requests for data require additional data retrieval from the origin database, which introduces network transmission delays to obtain data from the origin and to return the data to the client. A client may also have the ability to use scripts to handle processing of a request at the edge location. However, these scripts have limited capability. For various security reasons, they are unable to make network calls. For example, they are unable to access databases or make changes to databases at the CDN.

BRIEF DESCRIPTION OF THE DRAWINGS

FIG. 7A illustrates obtaining database data at a local edge datastore, according to some embodiments.

FIG. 7B illustrates inserting a key-value object into a local edge datastore for low latency datastore access at the edge, according to some embodiments.

FIG. 10 illustrates an interface for specifying a function for low latency writes to local tables at the edge, according to some embodiments.

Figure 1:
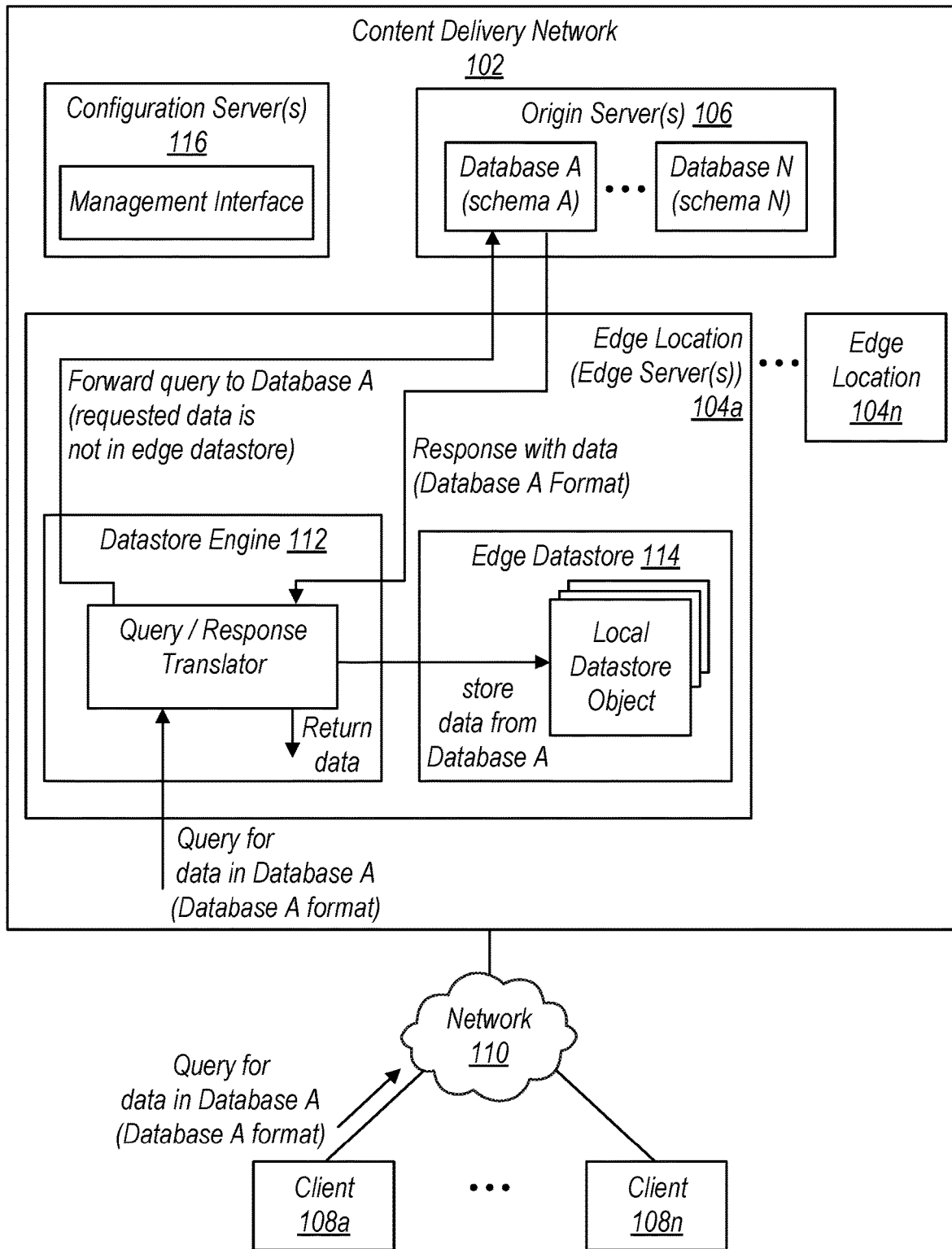
FIG. 1 is a logical block diagram illustrating a system for low latency query processing and data retrieval at the edge, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement low latency query processing and data retrieval at the edge, according to some embodiments. The systems and methods described herein may be employed in various combinations and in various embodiments to implement low latency datastore access for event-triggered functions at the edge, according to some embodiments. The systems and methods described herein may be employed in various combinations and in various embodiments to implement low latency writes to local tables by event-triggered functions at the edge, according to some embodiments.

In embodiments, the various techniques described herein may reduce the amount of time to process a request from a client (e.g., a request to retrieve data from a database and/or a retrieve a result based on retrieved data), compared to traditional techniques for processing requests. In various embodiments, the time to retrieve data and/or process retrieved data by event-triggered functions may be reduced, while still maintaining security for function processing. For example, a function at an edge location may execute in an isolated execution environment and/or not make network calls, while still having access to data from database tables). Moreover, the function may insert data into a table that is based on data from a database table, wherein the inserted data remains local to the edge location.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 16 and described below.

This specification begins includes descriptions of a system for low latency query processing and data retrieval at the edge, a system for low latency datastore access for event-triggered functions at the edge, and a system for low latency writes to local tables by event-triggered functions at the edge. A number of different methods and techniques to implement the above techniques are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for low latency query processing and data retrieval at the edge, according to some embodiments.

As shown, a CDN 102 may include any number of edge locations 104a-104n, each of which may obtain (e.g., fetch) data from any number of databases that are hosted by any number of origin servers 106. As depicted, the databases may by different types of databases that have different schemas. For example, database A may be a key-value database that uses a particular schema, database N may be a relational database that uses a different schema, any another of the databases may be a different type relational database that uses a different schema. In embodiments, the different types of databases process queries and provide responses that are each in different formats. For example, commands, syntax, and/or metadata used for creating or interpreting queries/responses for a particular backend database at an origin server(s) may be different than commands, syntax, and/or metadata used for creating or interpreting queries/responses for any of the other backend databases at the origin server(s).

In embodiments, an edge location 104 may include any number of edge servers that may perform any of the techniques described herein. In some embodiments, the edge location may be a data center of the CDN (e.g., a POP). In embodiments, one or more remote origin servers 106 of the CDN (e.g., at a remote data center) may provide data/objects to the edge location (e.g., in response to a client request for the data). In embodiments, any number of different clients 108 of the CDN may request data from the CDN (e.g., by sending a request from a remote network of the client) and the CDN may return the data to the requesting client. As shown, a given client may communicate with the CDN via a wide area network 110 (e.g., the internet).

In the depicted embodiment, an edge location (e.g., edge location 104a) includes a datastore engine 112 that implements a query/response translator and an edge datastore 114 that stores data (e.g., as a local datastore object) obtained from any number of the databases on behalf of the client. In embodiments, the edge datastore may be an in-memory datastore of the edge server (e.g., random access memory), or any other type of volatile or non-volatile memory. As shown, the CDN may also include any number of configuration servers 116, which may be used by a client to configure/enable edge locations to perform any number of the techniques described herein on behalf of the client (e.g., by receiving input from a client via a management interface). For example, the a configuration server may receive, from the client 108a, an indication to enable storing of data of one or more of the databases into edge datastores at edge locations (and/or use event-driven functions described herein) and based on the indication, the CDN may configure the edge location 104a (and/or any other number of edge locations) to store data for the one or more databases in the edge datastore on behalf of the client (and/or use event-driven functions).

As shown, the datastore engine may receive, from a client (e.g., client 108a), a query for data in database A. The query may be in a format for database A (different than query formats of the other databases). The datastore engine 112 may identify, based on the query, databases A as the target database for the query. For example, the datastore engine may determine that identifying data in the query indicates the query is for database A.

The query/response translator may translate the query, based on the identified database A, from a format for database A into a native format for the edge datastore 114. The datastore engine may then determine, based on the translated query, whether the data exists at the edge datastore. For example, the datastore engine may apply the translated query to the edge datastore and determine whether the data is returned from the query. In embodiments, the native format for queries/responses used for the edge datastore is different than the various formats for queries/responses used for the databases at the origin server(s) 106 (e.g., databases A-N). Therefore, the query/response translator may have the capability to translate a responses/queries from different formats of the different back-end databases into the native format of the edge datastore, and vice-versa.

If the datastore engine determines that the data does not exist at the edge datastore, then the datastore engine may forward the query that was received from the client to database A. In some embodiments, the datastore engine may provide security credentials associated with the client to authorize the request and forward the request/credentials to the origin server/target database. The datastore engine may receive the response with the requested data, in the format for database A. The datastore engine may parse the response, based on the format for database A, to obtain the data. The datastore engine may then store the data into the edge datastore (e.g., in a key-value format and/or any other suitable format). The datastore engine may also send the response to the client. In embodiments, the datastore engine may be capable of translating/parsing queries and responses in the same way for any of the databases of the CDN.

In embodiments, if the datastore engine determines that the data exists at the edge datastore, then the datastore engine may generate a response in the format for the database (e.g., by translating from the native response format of the datastore engine or directly creating the response in the format for the database based on knowledge of the request/response format of the database), wherein the generated response includes the data. The datastore engine may then send the generated response to the client.

In embodiments, the datastore engine may subsequently receive another query from the client for a portion of the data from database A (e.g., less than the entire amount of data indicated in the query above). The datastore engine may identify, based on the other query, database A as the target database for the other query. The datastore engine may translate the query, based on the identified database A, from a format for database A into a native format for the edge datastore 114. The datastore engine may then determine, based on the translated query, whether the data exists at the edge datastore.

In response to determining that the portion of the data exists at the datastore, the datastore engine may generate a response in the format for database A, wherein the other response includes the portion of the data. The datastore engine may then send the other response to the client. By using the above technique, the datastore engine may quickly provide a response to a subsequent query for only a portion of the data that was previously added to the local edge datastore (due to the previous query), without the need to fetch data from the target database. This reduces the time for clients to retrieve data, compared to traditional techniques that use caching.

In various embodiments, data that is stored into the edge datastore due to multiple queries may be provided in response to a subsequent query from a client. For example, a first query may result in portion A of data from a particular table being stored into the edge datastore and another query may result in portion B of data from the particular table being stored into the edge datastore. An additional query for at least some of portion A data and at least some of portion B data may be provided in a response by the edge datastore. By using multiple queries over time to re-construct data from the backend database tables at the edge, the datastore engine may provide low-latency access to data from the backend database tables (avoiding the need to retrieve data from the back-end tables to serve subsequent queries).

In embodiments, the datastore engine may determine whether the requested data found in the edge datastore is stale. If so, then the datastore engine will retrieve the data from the source database, as described above. If not, then the datastore engine will generate a response for the requested data.

In some embodiments, the datastore engine may not be able to parse data from certain databases (e.g., due to not having the necessary translator software installed). In such cases, the datastore engine may instead store the response with an associated cache key. For example, the datastore engine may determine that data requested in a query is not in the edge datastore, send a query to database X, receive a response from database X, and store the response and an associated cache key into the edge datastore. The datastore engine may also send the response to the client. The datastore engine may send the same cached response to the client for any subsequent queries for the same data. Subsequent queries for the same data may result in a match with the cache key and therefore the database engine can return the associated response.

At some point, the datastore engine may receive an update (e.g., from an administrator or update service at the CDN) and install the update, which allows the datastore engine to translate queries/response for database X. Once this occurs, the datastore engine may begin to translate queries/response for database X and store data into the edge datastore as described above (avoiding the need to store the entire response with cache key).

In embodiments, the datastore engine may associate a time to live (TTL) with data when it stores data into the edge datastore. Therefore, when the datastore engine determines that data exists in the edge datastore (in response to a query), the datastore engine may determine, based the TTL associated with the data at the edge datastore, whether the requested data is stale (e.g., greater than a time or an amount of time indicated by the TTL). In response to determining that the data is not stale, the datastore engine may generate a response that includes the data and send the response to the client.

In embodiments, the database may require authorization of the requesting entity in order to response to queries. Therefore, when sending a query to a database, the datastore engine may providing, to the database, security credentials (e.g., along with the request or as part of the request). The security credentials may be assigned to the client and may be used by the database to authorize the query submitted to the database on behalf of the client.

Figure 2:
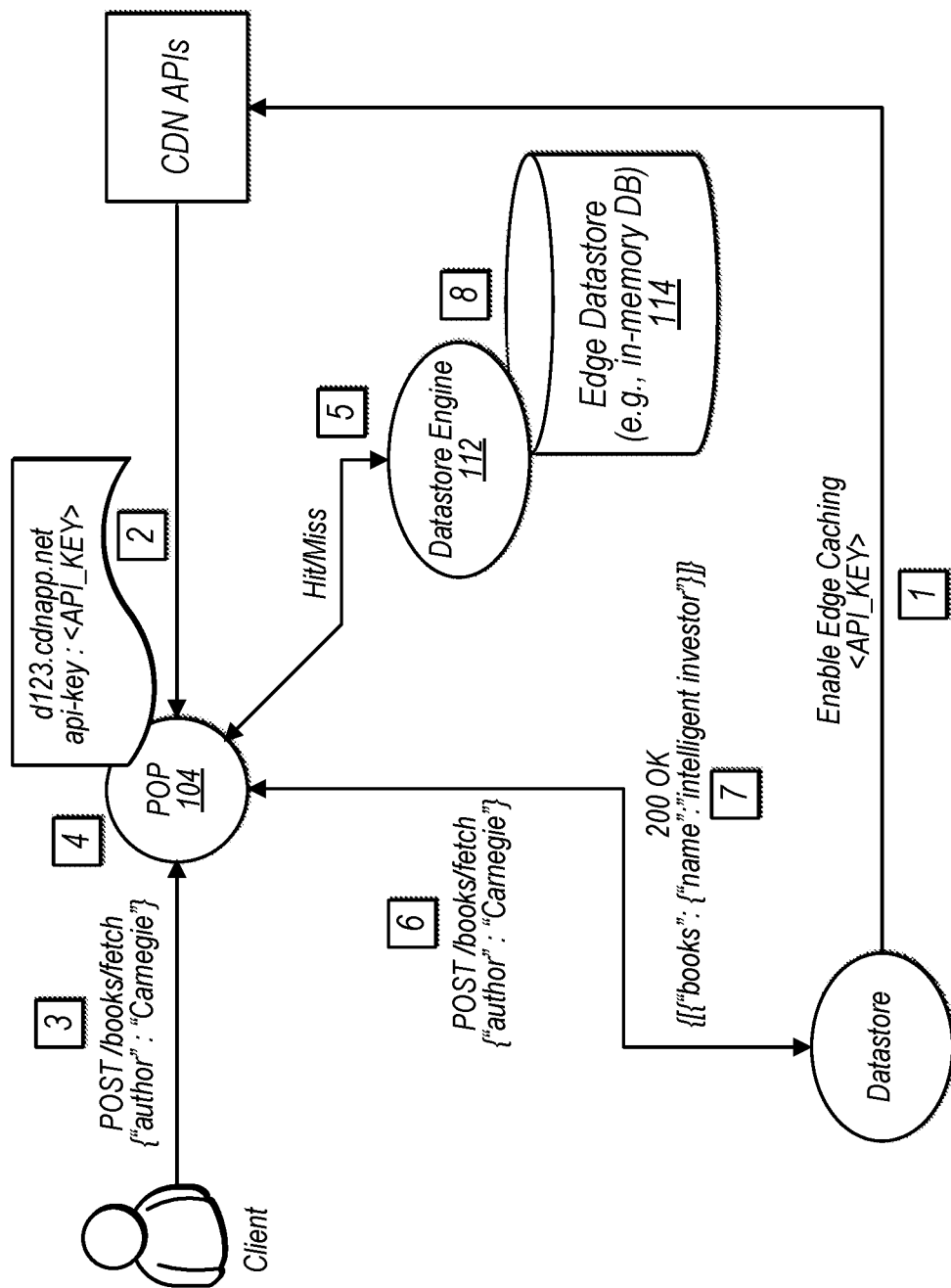
FIG. 2 is a logical block diagram illustrating low latency query processing and data retrieval at the edge, according to some embodiments.

FIG. 2 is a logical block diagram illustrating low latency query processing and data retrieval at the edge, according to some embodiments.

In the example embodiment, a client may enable edge caching (e.g., enable use of the edge datastore for the client as described above). For example, a client user/administrator may select an option at a datastore/database to enable the use of edge caching. As shown, APIs at the CDN may obtain security credentials associated with the client (e.g., API KEY) from the datastore/database application and provide, a request to enable edge caching for the client along with the security credentials. The security credentials may be stored at the edge location in association with the client's CDN distribution at the edge (e.g., by the CDN application and/or the datastore engine). The datastore engine and/or other application may then enable edge caching for the client (based at least on authorization using the security credentials).

In embodiments, the datastore engine may use these security credentials (and/or other credentials associated with the client) to authorize a request from the client and/or to forward the request to the datastore/database at the origin server. As described herein, the response may then be received from the datastore/database and the returned data may be stored at the edge datastore along with a TTL. In embodiments, the response/data is also returned to the client (e.g., returned to the requesting layer of the CDN application and then sent to the client).

As shown, when the client submits a POST query for books from a particular author, the datastore engine determines whether the data is in the edge datastore (e.g., as described above). In the depicted embodiment, the data is not there (e.g., a "miss"), so the request is forwarded to one of the databases. A response is provided to the datastore engine, where the data is stored into the edge datastore and the response is sent to the client.

Figure 3:
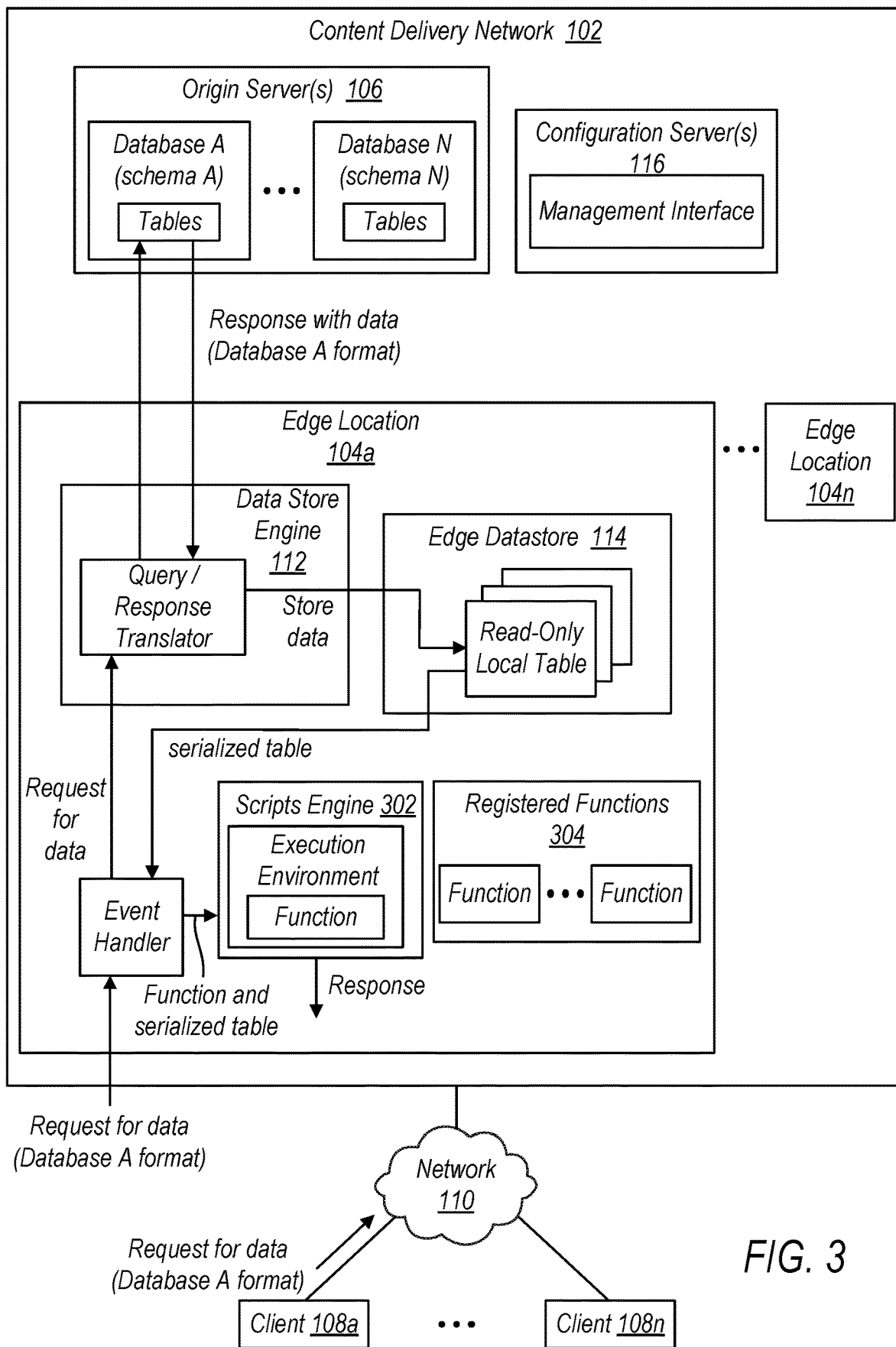
FIG. 3 is a logical block diagram illustrating a system for low latency datastore access for event-triggered functions at the edge, according to some embodiments.

FIG. 3 is a logical block diagram illustrating a system for low latency datastore access for event-triggered functions at the edge, according to some embodiments.

As in FIG. 1, the depicted CDN 102 includes a datastore engine 112, edge datastore 114, origin server(s) 106, and configuration server(s) 116. In the example embodiment, a given edge location (e.g., edge location 104a) also includes a scripts engine 302 capable of executing any number of registered functions 304 in its own execution environment (e.g., within an isolated environment/container). In some embodiments, any number of functions may execute concurrently, each in its own isolated execution environment/container of the scripts engine. In some embodiments, after execution of a given function, the function and/or the isolated execution environment/container terminates so that resources (memory, computing hardware/software, etc.) that were used by the function and/or the isolated execution environment/container are made available to initialize and/or run another function and/or the isolated execution environment/container. The edge location also includes an event handler 306, which detects different events and determines whether to trigger one of the functions in response to detecting the event (based on client-specified configurations of the registered functions). In some embodiments, the scripts engine, functions, and/or any other components of FIG. 3 may perform in the same or similar way as the scripts engine, functions, and/or any other components of other figures.

As shown, the edge location (e.g., edge server) may receive, from a client (e.g., client 108*a*), a request (e.g., query) for data in database A (in a format for database A). One of the registered functions may be registered to execute in response to a particular event occurring during request processing (e.g., encountering a request for data from one of the tables that are associated with the function during configuration of the function by a user). During processing of the request, the event handler detects the particular event has occurred (e.g., the edge server encounters the event during the request processing). In response to encountering the event (e.g., in response to detection of the event), the event handler causes one of the registered functions to execute in the isolated execution environment of the scripts engine 302.

As described in more detail below, the function accesses the requested data at one or more of the corresponding read-only local tables at the edge location, and the accessed data is based on data obtained at the edge location from the a particular table(s) of one of the databases (e.g., database A). In embodiments, the data of a given read-only local table is accessed within the isolated execution environment without making network calls. For example, the data may be passed to the function as part of the function call. The data and/or result(s) of processing of the accessed data may then be sent to the client in a response.

In some embodiments, a given function may use any data of the local table(s) to perform any number of operations/calculations to generate one or more results, which are returned to the client as part of a response. For embodiments in which functions have write access to a local table (e.g., using APIs as discussed for FIG. 8), the function may also (or instead) write the one or more results to the local table, at least some of which may be used as input for later operations/calculations performed by the function and/or other functions.

In embodiments, the data in the read-only local table may first be obtained from the target database (using the same or similar techniques described above for FIG. 1) and then provided to the function for access during execution (e.g., in a portion of memory mapped to the function). For example, before execution of the function, the datastore engine may identify, based on the request for data, a table of a database, determine that the requested data and/or corresponding local table does not exist in the edge datastore, and in response, obtain the data from the table of database A (applying any filter(s) to reduce the amount of data obtained from the table, if any were specified during configuration of the function).

The datastore engine may then create a read-only local table using the obtained data and store the read-only local table at the edge datastore (in some embodiments, if the read-only local table for the table of database A already exists in the edge datastore, then the obtained data may simply be added to the local table). The datastore engine may then send the read-only local table (or at least the requested data) to the function and/or to a destination associated with the function (e.g., to the event handler or other component that may initiate execution of the function or cause the function to be executed in the isolated execution environment). In embodiments, the datastore engine may convert the local table/data from a format (e.g., key-value format) into a different format (e.g., a serialized format) before sending the local table/data to the destination/function.

The read-only local table may be exposed to the function during execution (e.g., stored in memory mapped to the function or otherwise provided to the function as a function parameter). Therefore, the function may have access to data that was obtained from a table at database A, even though the function is unable to make network calls outside of the execution environment and/or the edge location. In embodiments, any number of local tables may be sent to the function using the above techniques.

In embodiments, prior to execution of the function, the event handler (or other component of the edge server/proxy server) may: identify, based on a pre-defined event (e.g., request for data from a particular database table), the function associated with the event and the one or more corresponding read-only local tables associated with the function (based the function configuration); obtain, from a location (e.g., a datastore at the edge location or another location), code for the function; and obtain, from the datastore engine, one or more corresponding read-only local tables. Any number of those local tables may already exist in the edge datastore (e.g., due to previous use by other functions). However, if any of the local tables are not present or not usable (e.g., stale), then they may first need to be created (or updated) by obtaining the data from the source database table, as described herein.

In various embodiments, providing a low-latency datastore further enhances the capability of edge functions. Without access to data (e.g., data from back-end origin databases), edge functions may have limited functionality, and allowing such edge functions to make network calls to access data (e.g., from origin databases) would add a high amount of latency in order to obtain the data. By allowing low latency datastore access to event-triggered edge functions as described herein, edge functions can access data from origin databases without incurring the high latency associated with network calls (by allowing access to the datastore that has been populated from the origin database).

Figure 4:
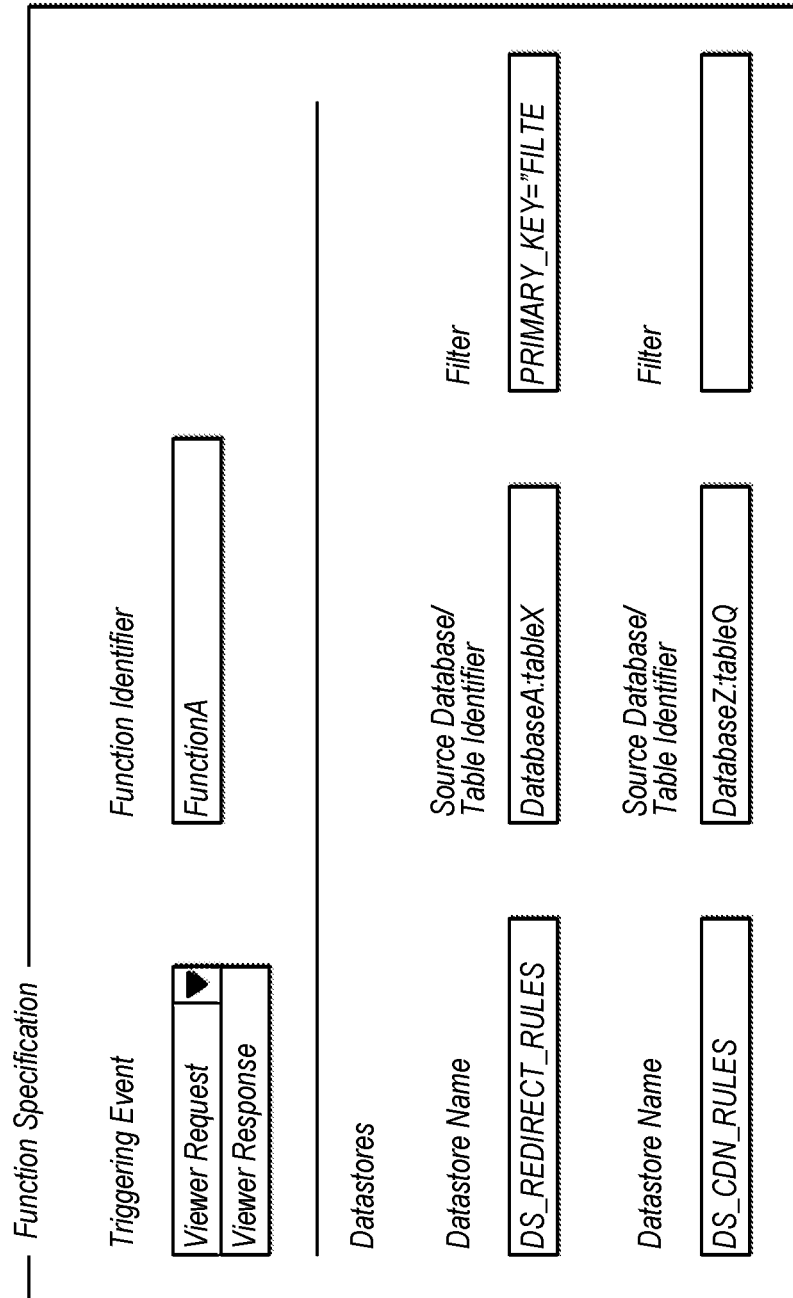
FIG. 4 illustrates an interface for specifying a function for low latency datastore access at the edge, according to some embodiments.

FIG. 4 illustrates an interface for specifying a function for low latency datastore access at the edge, according to some embodiments.

In the example embodiment, a function specification window allows a client to specify a function configuration. The client may specify a triggering event that when encountered, will cause the function to execute. As shown, the client may indicate whether the event is a request or response event. The client may also specify a function identifier (e.g., a unique name for the function). In embodiments, the client may not be required to specify a triggering event for the function. For example, the function may, by default, be invoked/executed in response to incoming requests for data (or invoked for certain types of requests for data, such as request directed to a particular target database and/or table).

The client may also specify one or more tables of one or more of the databases that are to provide data for one or more corresponding read-only local tables at a given edge server. The client may specify a name for the read-only local table, a unique identifier for the source table and/or database, and optionally a filter to apply to the source table. This may reduce the amount of data that is pulled by the datastore engine when obtaining data based on a client query for data.

Figure 5:
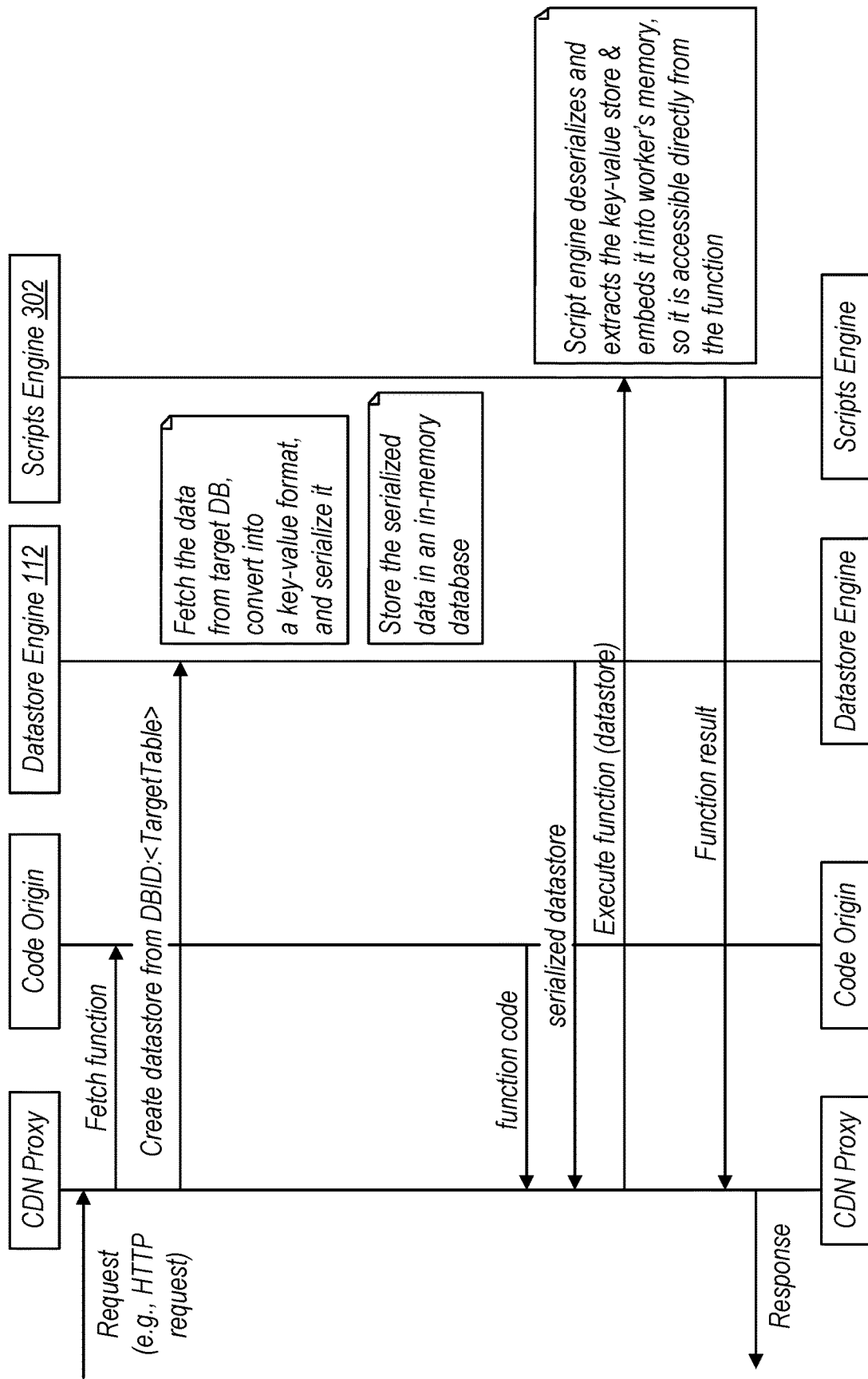
FIG. 5 illustrates processing an event-triggered function at the edge, according to some embodiments.

FIG. 5 illustrates processing an event-triggered function at the edge, according to some embodiments.

As shown, when a CDN proxy/edge server of the edge location detects a triggering event associated with a registered function (request from a client or data from a table), the CDN proxy fetches the function from a location that stores the function code (code origin) and also creates a datastore (read-only local table) in the datastore engine. The datastore engine fetches the data from the target database, creates a key-value object store of the data, serializes the data, and sends the serialized data to the CDN proxy.

The CDN proxy than sends the function and serialized data to the scripts engine, where the function is executed and accesses the data. As shown, the scripts engine de-serializes the data and extracts the data into a key-value store, where it is embedded into memory and is accessible to the function. The function may return a result to the CDN proxy, which may then send a response to the client that includes the result.

Figure 6:
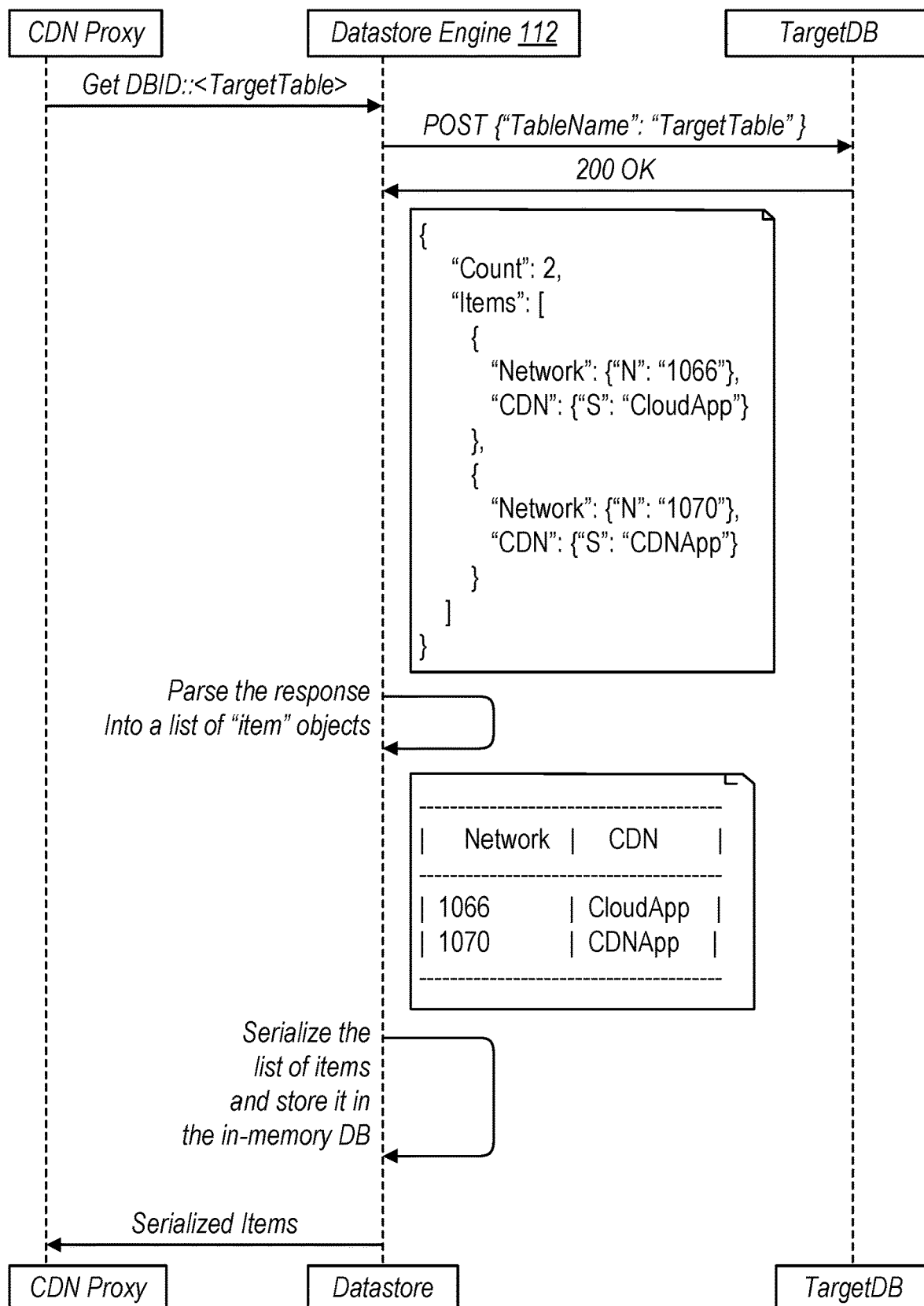
FIG. 6 illustrates inserting database data into a local edge datastore for low latency datastore access at the edge, according to some embodiments.

FIG. 6 illustrates inserting database data into a local edge datastore for low latency datastore access at the edge, according to some embodiments.

As depicted, the CDN proxy sends a request for data to the datastore engine and in response to receiving the request, the datastore engine sends a request for the data to the target database in a format for the target database. The datastore engine receives a response in a format for the target database (e.g., JSON file). The datastore engine parses the response to obtain a list of "item" objects, which may then be stored into a key-value object store (or another type of table). The list may be serialized and stored in the edge datastore and/or returned to the CDN proxy/edge server as an in-memory DB, to be used by a function.

Although the depicted example shows the datastore engine receives data from the target database in a JSON format and converts the data into a tabular key-value format for storage in the datastore engine, the datastore engine may receive data in any type of format and convert the data into any other type of format (e.g., for storage in the edge datastore). Furthermore, in various embodiments the datastore engine may convert the data into multiple different types of formats, each of which may be stored in the edge datastore.

FIG. 7A illustrates obtaining database data at a local edge datastore, according to some embodiments.

As shown, a query 702 is sent to a target database of the CDN. The response 704 is received in a format for the target database. For example, the format may be in JSON or any other format specific to the target database. As shown, the response includes two items that matched the query (data describing two different dogs).

FIG. 7B illustrates inserting a key-value object into a local edge datastore for low latency datastore access at the edge, according to some embodiments.

As depicted, the response of FIG. 7A is parsed and converted by the datastore engine into a key-value object 706 Pets. The Pets object may then be serialized and inserted into the edge datastore 708 associate with the key "D345.PETS," which may also include any number of other serialized objects. The serialized data may be passed to a destination (e.g., scripts engine) for use by a function.

Figure 8:
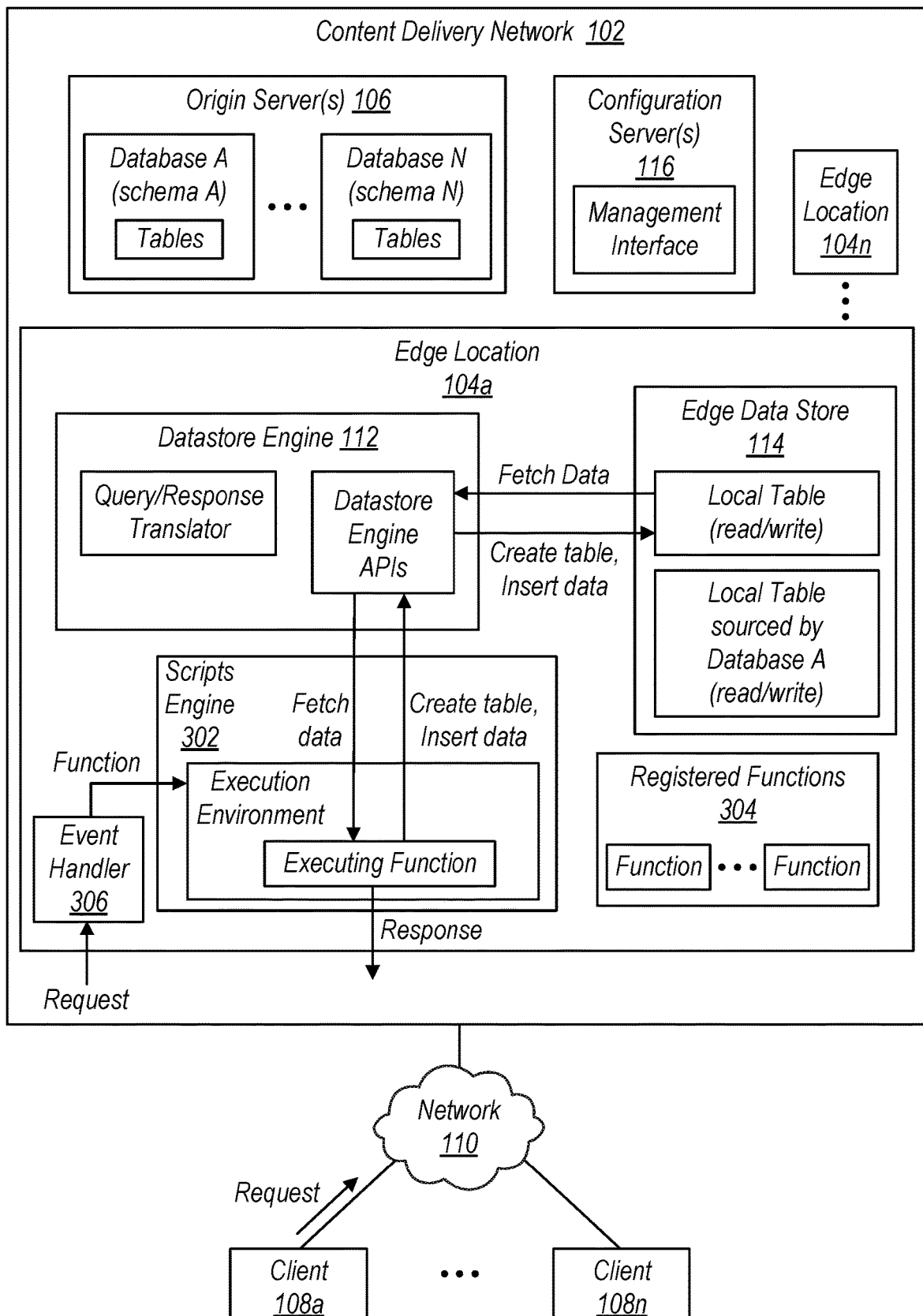
FIG. 8 is a logical block diagram illustrating a system for low latency writes to local tables by event-triggered functions at the edge, according to some embodiments.

FIG. 8 is a logical block diagram illustrating a system for low latency writes to local tables by event-triggered functions at the edge, according to some embodiments.

As in FIG. 3, the depicted CDN 102 includes components such as a datastore engine 112, edge datastore 114, origin server(s) 106, configuration server(s) 116, and a scripts engine. As shown, the edge location (e.g., edge server) may receive, from a client (e.g., client 108a), a request (e.g., query for data in database A, in a format for database A).

One of the registered functions may be registered to execute in response to a particular event occurring during request processing. During processing of the request, the event handler detects the particular event has occurred (e.g., the edge server encounters the event during the request processing). In response to encountering the event (e.g., in response to detection of the event), the event handler causes one of the registered functions to execute in the isolated execution environment of the scripts engine 302.

As described in more detail below, the function may provide a request to the datastore engine (e.g., via an API of the datastore engine). For example, the function may provide, to the datastore engine, a request to create a local table or to insert data into a local table of the edge datastore. Note that in embodiments, the datastore engine and the edge datastore are external to the isolated execution environment and are hosted by the at least one edge server. In response to receiving the request (e.g., via the API), the datastore engine may create the local table or insert the data into a local table. In embodiments, the inserted data remains local to the edge location (e.g., changes do not propagate outside of the edge location to source tables at the origin server(s)).

In embodiments, when a local read/write table is created, it may be initially populated/sourced by a target table of a database (the source of truth) as described herein. In embodiments, a function may make changes to data from the target database, but the changes remain local to the edge location. In embodiments, the function may also delete a local table via a datastore engine API. Note that in some embodiments, the datastore engine may obtain source data for a local table in the same or similar way as described above (e.g., for FIGS. 1 and/or 3).

In some embodiments, any type of table operations may be available for a function to perform via APIs on local tables in the edge datastore (e.g., create table, insert data, fetch data, delete entry, delete table, etc.). For example, a function may provide to the datastore engine (e.g., via a delete API) a request to delete an entry from a local table (the request may indicated a particular key). In response to receiving the indication of the table and the particular key, the datastore engine may delete an entry from the local table that has the particular key. In embodiments, the deletion of the entry remains local to the edge location (e.g., does not propagate to backend database tables).

If requested data (e.g., using the fetch API) is not present in a local table at the edge datastore (or the local table does not exist), then the datastore engine may obtain the data from the source table (or create the table) as described herein. For example, a function may submit (via the fetch API) a request for data from a local table (e.g., an item/row of the table) that corresponds to a particular key.

In response to determining that the local table includes the particular key, the datastore engine may provide, to the function, the data that corresponds to the particular key. In response to determining that the local table does not include the particular key, the datastore engine may obtain, from the table assigned as the source of truth for the local table, the data that corresponds to the particular key. The datastore engine may then insert that data into the local table and send the data to the function. In embodiments, the data in the local table is accessible to other copies/instances of the same function that are each running in an isolated execution environment and/or other functions that are each running in an isolated execution environment.

In various embodiments, the datastore engine APIs may perform any locking mechanisms for the local tables in order to protect data that is accessed by any number of functions. For example, if two different functions are attempting to write to the same data at the same local table, then the APIs will only allow one function to access and/or modify the data at a time.

In embodiments, the use of APIs for local tables of the edge datastore may allow functions to accumulated data in the local tables. That accumulated data may be used to enhance decisions made at the edge. This may provide flexibility for a client that wishes to perform various operations on data and modifications to data to determine various possible results/outcomes, without affecting data at the backend source tables.

Figure 9:
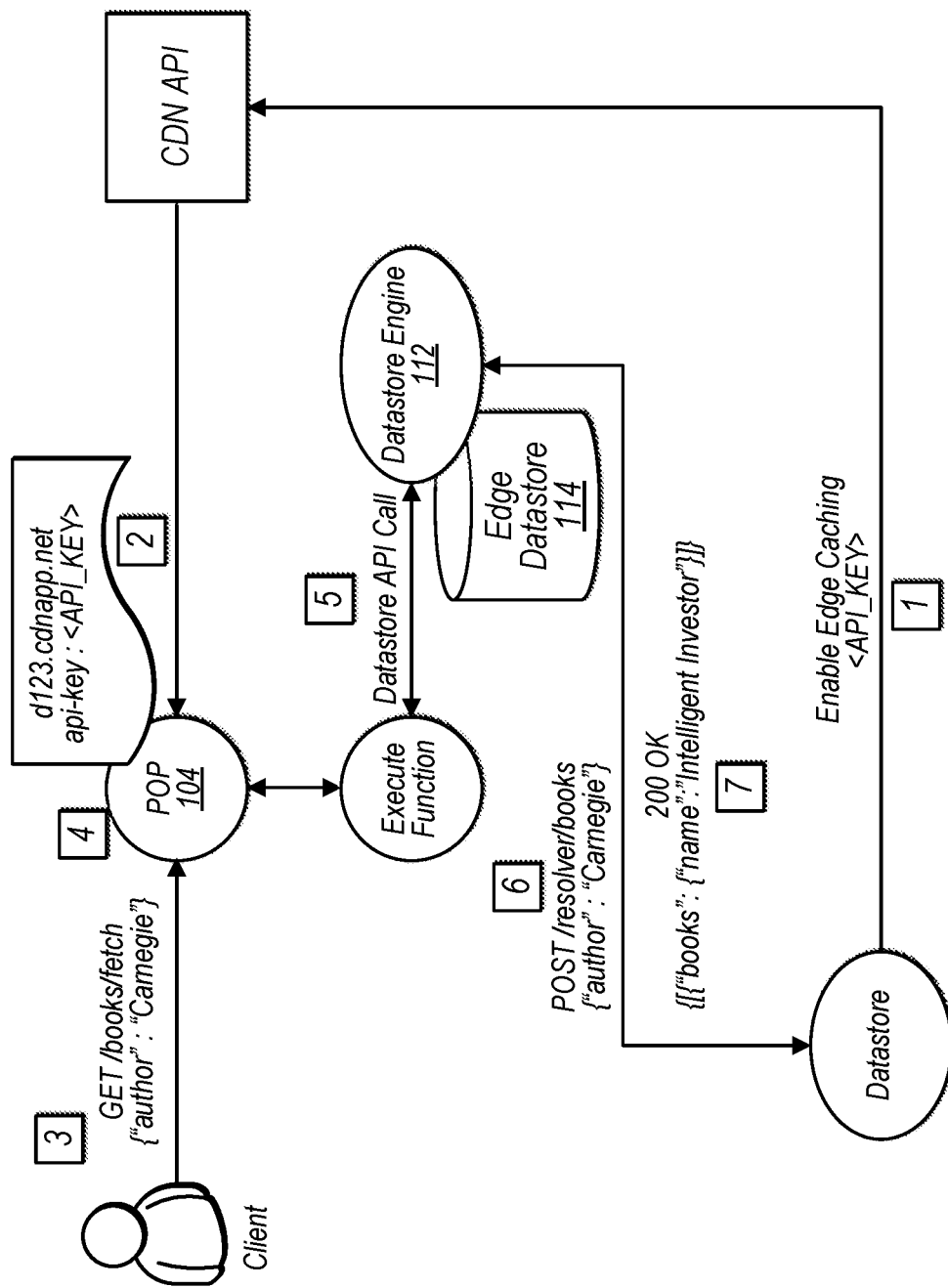
FIG. 9 is a logical block diagram illustrating low latency datastore access for event-triggered functions at the edge, according to some embodiments.

FIG. 9 is a logical block diagram illustrating low latency datastore access for event-triggered functions at the edge, according to some embodiments.

As shown, a client may enable use of event-triggered functions for edge caching (e.g., enable use of the functions for the client as described above). APIs at the CDN may obtain security credentials associated with the client (e.g., API KEY) from the datastore/database application and provide, to the edge location, a request to enable edge caching for the client along with the security credentials. The security credentials may be stored at the edge location in association with the client's CDN distribution at the edge (e.g., by the CDN application and/or the datastore engine). The datastore engine and/or other application may then enable edge caching for the client (based at least on authorization using the security credentials).

In some embodiments, the datastore engine may use these security credentials (and/or other credentials associated with the client) to authorize a request from the client and/or to forward the request to the datastore/database at the origin server. As described herein, the response may then be received from the datastore/database and the returned data may be stored at the edge datastore along with a TTL. In embodiments, the response/data is also returned to the client (e.g., returned to the requesting layer of the CDN application and then sent to the client).

In the example embodiment, when the client submits a GET query for books from a particular author, a function is triggered to access the data. In the depicted embodiment, the function sends, to the datastore engine via an API of the datastore engine, a request for the data. In embodiments, the request may indicate a particular key associated with the requested data.

If the datastore engine determines that the requested data is not in the edge datastore (e.g., there is no local table that is sourced from the target table or a local table is sourced from the target table but does not include the particular key associated with the data), then the request is forwarded to the target database. A response is provided from the target table to the datastore engine, where the data is stored into the edge datastore (e.g., the book title "Intelligent Investor"). The data is stored into a read/write local table or a read-only local table, depending on how the function was configured by a user. The data is then provided, via the database engine API, to the function. The function may then return the data to the client and/or may process the data and return a result to the client based at least on the processing of the data. As described herein, other functions may access/modify data in the local table (e.g., via the datastore engine APIs).

FIG. 10 illustrates an interface for specifying a function for low latency writes to local tables at the edge, according to some embodiments.

As shown, a function specification window allows a client to specify a function configuration. The client may specify a triggering event that when encountered, will cause the function to execute. As shown, the client may indicate whether the event is a request or response event. The client may also specify a function identifier (e.g., a unique name for the function).

The client may also specify one or more local tables that the function is to be assigned read and write access to (or read only access to). The client may specify a name for the read-only local table and a type (e.g., read/write, read only, sourced from a datastore, and/or not sourced from a datastore). The client may also specify a maximum size of the local table. If the local table is sourced from a database, then the client specifies a unique identifier for the source table and/or database, and optionally a filter to apply to the source table. In embodiments, this may reduce the amount of data that is pulled by the datastore engine when obtaining data based on a client query for data.

Figure 11:
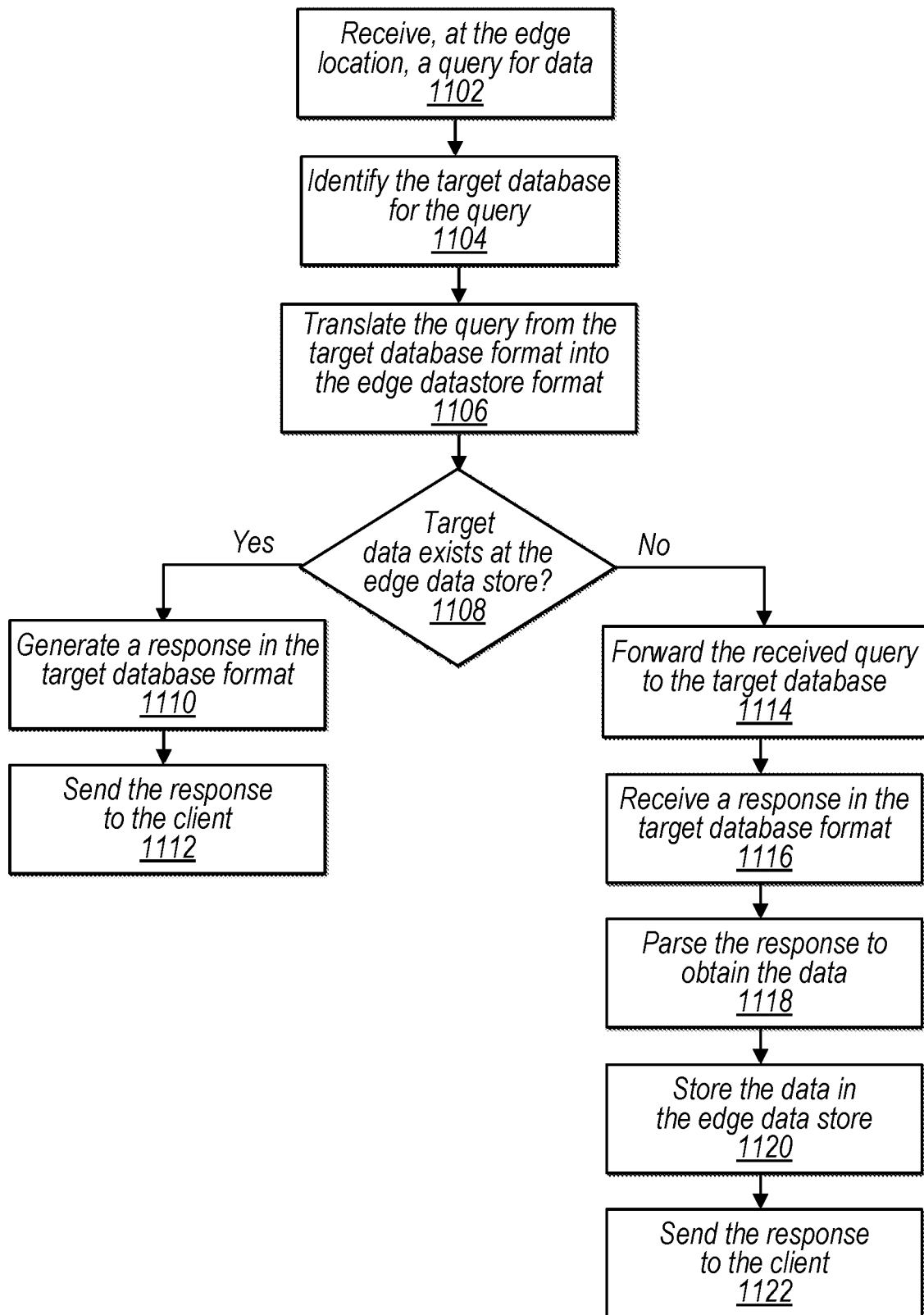
FIG. 11 illustrates a flow diagram for low latency query processing and data retrieval at the edge, according to some embodiments.

FIG. 11 illustrates a flow diagram for low latency query processing and data retrieval at the edge, according to some embodiments. These techniques, as well as the techniques discussed with regard to FIGS. 12-15, may be implemented using components or systems as described above with regard to FIGS. 1-10, as well as other types of components or systems, and thus the following discussion is not intended to be limiting as to the other types of systems that may implement the described techniques.

At block 1102, the edge server receives a query for data. At block 1104, the edge server identifies the target database for the query. At block 1106, the edge server translates the query form the target database format to the edge datastore format. At block 1108, the edge server determines whether the requested data exists at the edge datastore. If so, then at block 1110, the edge server generates a response in the target database format and at block 1112, the edge server sends the response to the client.

Returning to block 1108, if the edge server determines that the requested data does not at the edge datastore, then at block 1114, the edge server forward the received query to the target database. At block 1116, the edge server receives a response in the target database format. At block 1118, the edge server parses the response to obtain the data. At block 1120, the edge server stores the data into the edge datastore. At block 1122, the edge server sends the response to the client.

Figure 12:
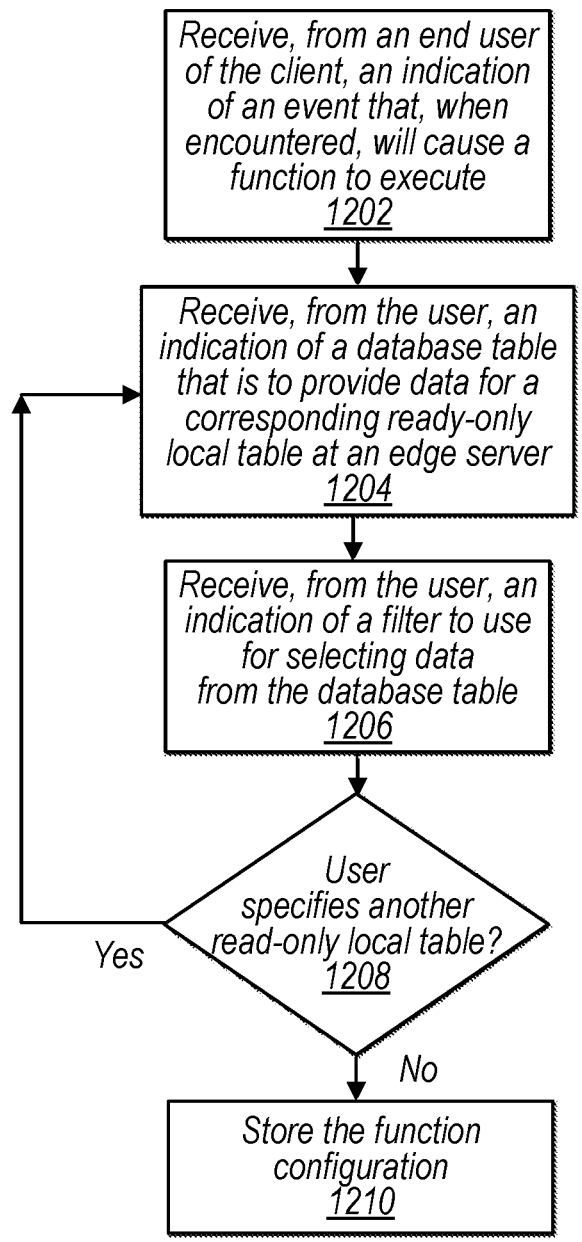
FIG. 12 illustrates a flow diagram for specifying a function for low latency datastore access at the edge, according to some embodiments.

FIG. 12 illustrates a flow diagram for a user specifying a function for low latency datastore access at the edge, according to some embodiments.

In embodiments, the interface of FIG. 4 may be used to receive inputs from a user to specify functions. At block 1202, the configuration server receives, from an end user of the client, an indication of an event that, when encountered, will cause a function to execute. At block 1204, the configuration server receives, from the user, an indication of a database table that is to provide data for a corresponding read-only local table. At block 1206, the configuration server receives, from the user, an indication of a filter to use for selecting data from the database table. At block 1208, the configuration server determines whether the user specifies another read-only local table. If so, then the process returns to block 1204. If not, then at block 1210, the configuration server stores the function configuration and/or registers the function at one or more edge locations.

Figure 13:
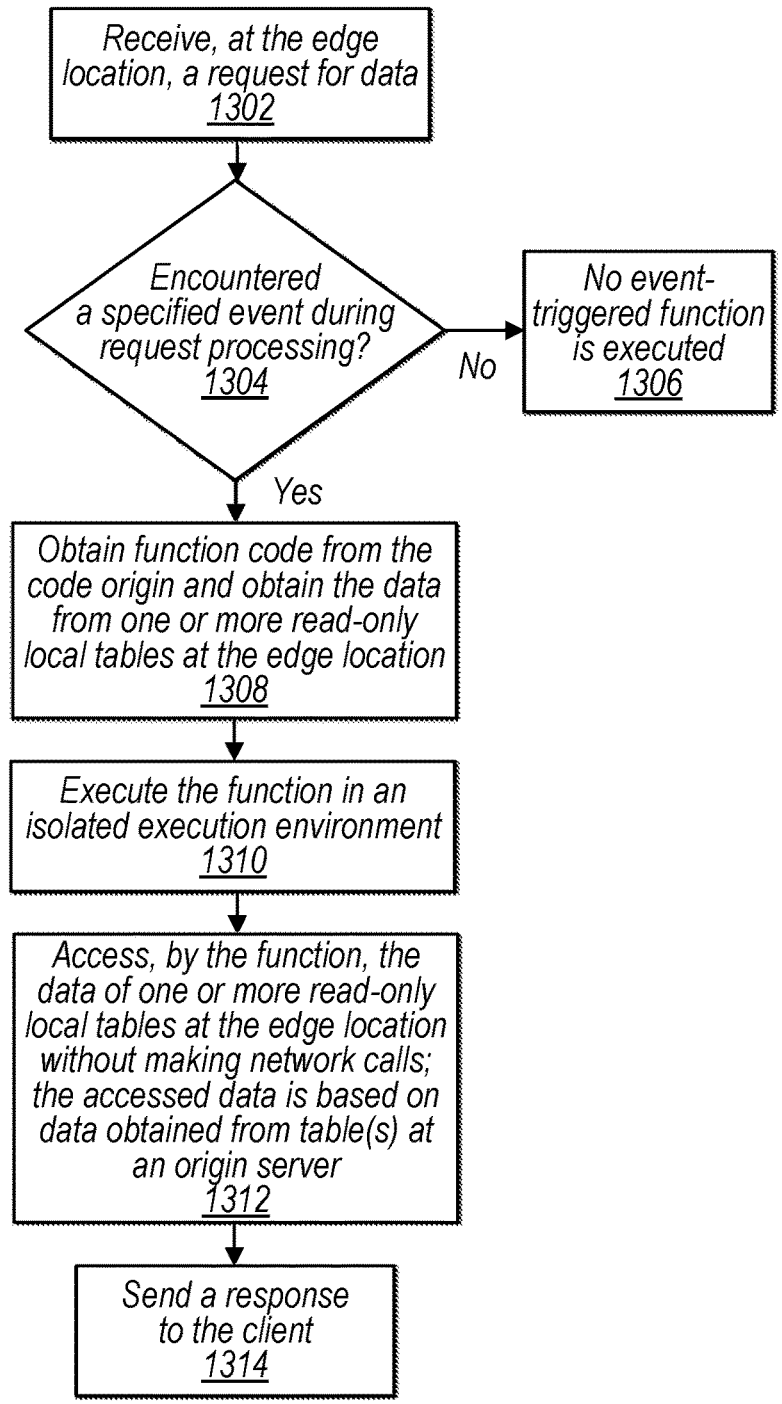
FIG. 13 illustrates a flow diagram for low latency datastore access for an event-triggered function at the edge, according to some embodiments.

FIG. 13 illustrates a flow diagram for low latency datastore access for event-triggered function at the edge, according to some embodiments.

At block 1302, the edge server receives, at the edge location, a request for data. At block 1304, the edge server determines whether a client-specified event has been encountered during the request processing (any processing/action that occurs at the edge location as a result of the request, which may include responses). If none of the specified events were encountered, then the process ends at block 1306.

Returning to block 1304, if the edge server determines that a client-specified event has been encountered during the request processing, then at block 1308, the edge server obtains function code from the code origin and obtains data from one or more read-only local tables. At block 1310, the edge server executes the function in an isolated execution environment. At block 1312, the function accesses the data of the one or more read-only local tables without making network calls. The accessed data is based on data obtained from one or more tables at one or more origin servers. At block 1314, the function sends a response to the client based at least on the accessing of the data.

Figure 14:
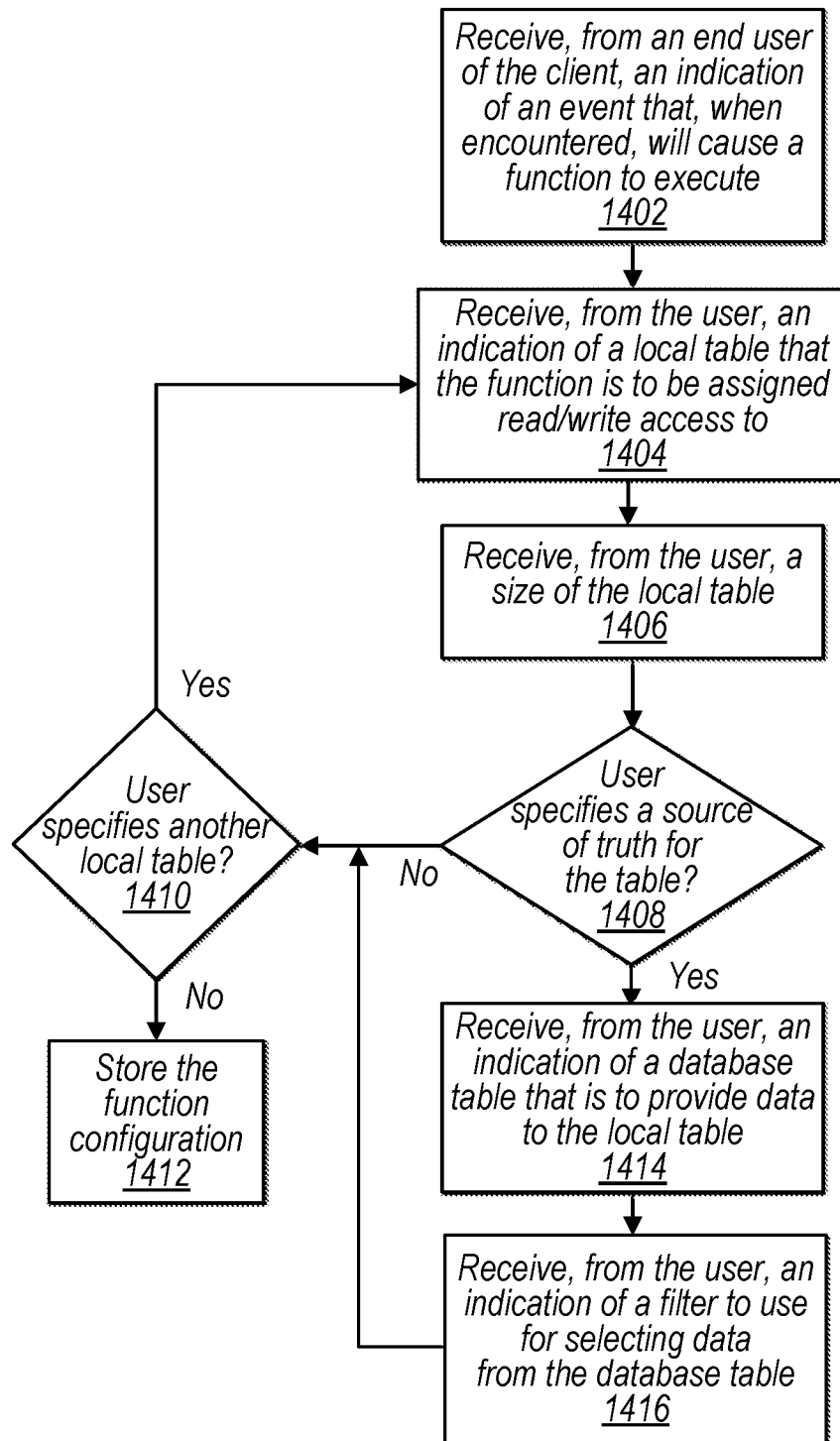
FIG. 14 illustrates a flow diagram for specifying a function for low latency writes to local tables at the edge, according to some embodiments.

FIG. 14 illustrates a flow diagram for specifying a function for low latency writes to local tables at the edge, according to some embodiments.

In embodiments, the interface of FIG. 10 may be used to receive inputs from a user to specify functions. At block 1402, the configuration server receives, from an end user of the client, an indication of an event that, when encountered, will cause a function to execute. At block 1404, the configuration server receives, from the user, an indication of a local table that the function is to be assigned read/write access to (or read only access).

At block 1406, the configuration server receives, from the user, an indication of a maximum size for the local table. At block 1408, the configuration server determines whether the user specifies a source of truth for the local table. If not, then at block 1410, the configuration server determines whether the user specifies another local table. If so, the process returns to block 1402. If not, then the configuration server stores the function configuration and/or registers the function at one or more edge locations.

Returning to block 1408, if the configuration server determines that the user specifies a source of truth for the local table, then at block 1414, then the configuration server receives, from the user, an indication a database table that is to provide data to the local table. At block 1416, the configuration server receives, from the user, an indication of a filter to use for selecting data from the database table. As discussed above, at block 1410, the configuration server determines whether the user specifies another local table. If so, the process returns to block 1402. If not, then the configuration server stores the function configuration and/or registers the function at one or more edge locations.

Figure 15:
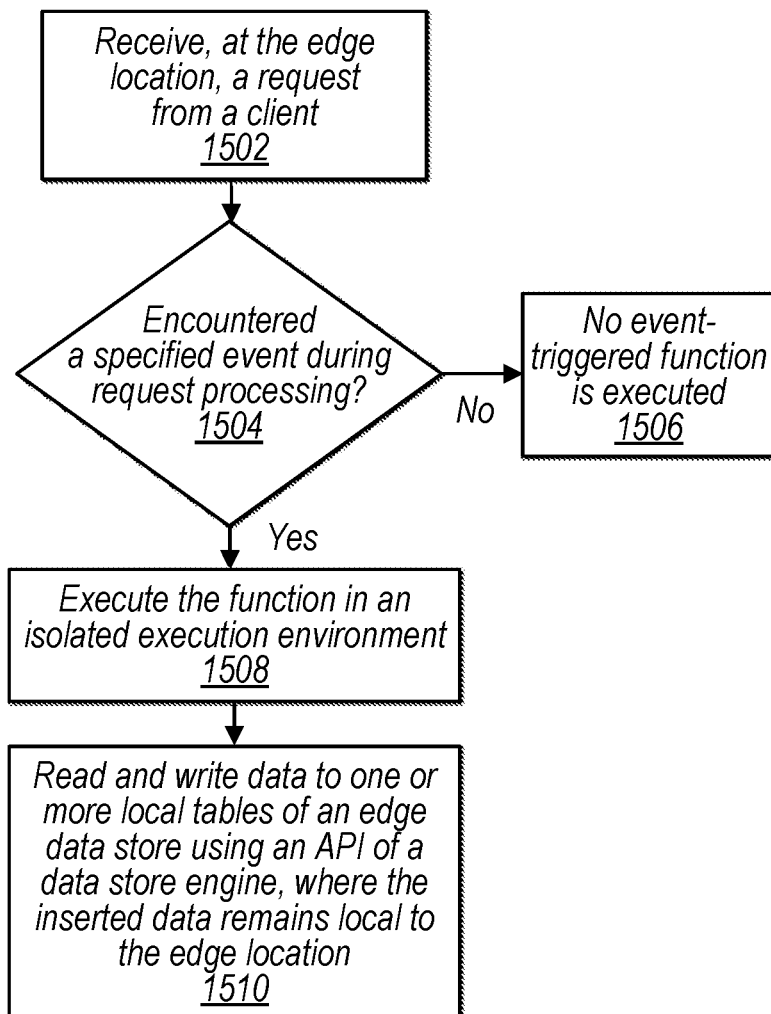
FIG. 15 illustrates a flow diagram for low latency writes to local tables by an event-triggered function at the edge, according to some embodiments.

FIG. 15 illustrates a flow diagram for low latency writes to local tables by an event-triggered function at the edge, according to some embodiments.

At block 1502, the edge server receives a request from a client (e.g., a request for data). At block 1504, the edge server determines whether a client-specified event has been encountered during the request processing (any processing/action that occurs at the edge location as a result of the request, which may include responses). If none of the specified events were encountered, then the process ends at block 1506.

Returning to block 1504, if the edge server determines that a client-specified event has been encountered during the request processing, then at block 1508, the edge server executes the function in an isolated execution environment. At block 1510, the edge server reads and/or writes data to one or more local tables of an edge datastore using an API of a datastore engine, where the inserted data remains local to the edge location.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of the datastore engine, scripts engine, functions, and other components that implement the techniques described herein). The various methods as illustrated in the figures and described herein represent example embodiments of methods. The order of any method may be changed, and various elements may be added, reordered, combined, omitted, modified, etc.

Figure 16:
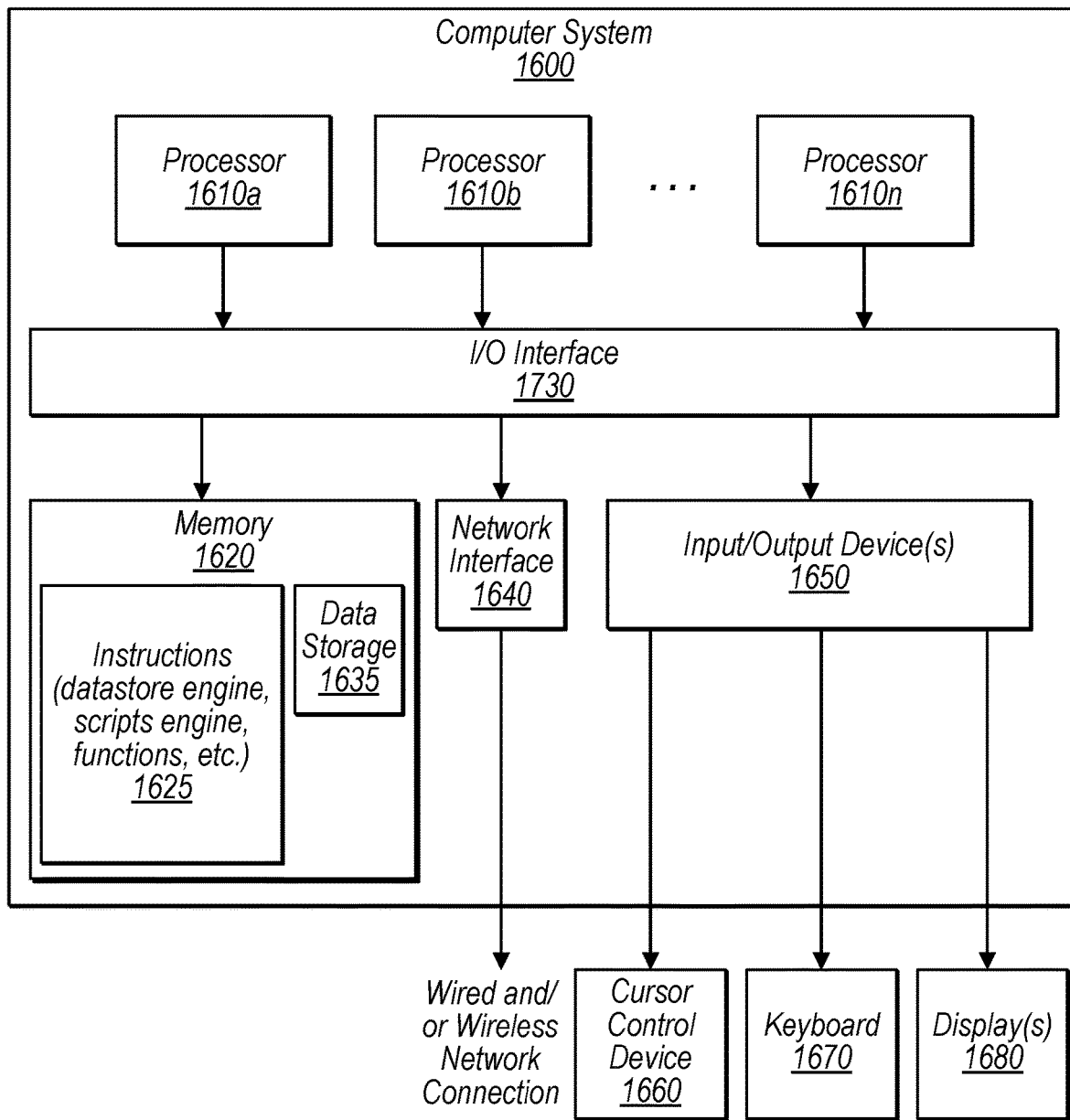
FIG. 16 is a block diagram illustrating an example computing system, according to some embodiments.

Embodiments to implement low latency query processing and data retrieval at the edge, low latency datastore access for event-triggered functions at the edge, and low latency writes to local tables by event-triggered functions at the edge as described herein may be executed on one or more computer systems, which may interact with various other systems or devices. One such computer system is illustrated by FIG. 16. In different embodiments, computer system 1600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1600 includes one or more processors 1610 coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. Display(s) may include standard computer monitor(s) and/or other display systems, technologies or devices, in one embodiment. In some embodiments, it is contemplated that embodiments may be implemented using a single instance of computer system 1600, while in other embodiments multiple such systems, or multiple nodes making up computer system 1600, may host different portions or instances of embodiments. For example, in one embodiment some elements may be implemented via one or more nodes of computer system 1600 that are distinct from those nodes implementing other elements.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions, in one embodiment. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

In some embodiments, at least one processor 1610 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1620 may store program instructions 1625 and/or data accessible by processor 1610, in one embodiment. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the datastore engine, scripts engine, functions, etc.) are shown stored within system memory 1620 as program instructions 1625 and data storage 1635, respectively. In other embodiments, program instructions and/or data may be received, sent or stored upon different types of computer-accessible media or on similar media separate from system memory 1620 or computer system 1600. A computer-accessible medium may include non-transitory storage media or memory media such as magnetic or optical media, e.g., disk or CD/DVD-ROM coupled to computer system 1600 via I/O interface 1630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1640, in one embodiment.

In one embodiment, I/O interface 1630 may be coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. In addition, in some embodiments some or all of the functionality of I/O interface 1630, such as an interface to system memory 1620, may be incorporated directly into processor 1610.

Network interface 1640 may allow data to be exchanged between computer system 1600 and other devices attached to a network, such as other computer systems, or between nodes of computer system 1600, in one embodiment. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or retrieving data by one or more computer system 1600, in one embodiment. Multiple input/output devices 1650 may be present in computer system 1600 or may be distributed on various nodes of computer system 1600, in one embodiment. In some embodiments, similar input/output devices may be separate from computer system 1600 and may interact with one or more nodes of computer system 1600 through a wired or wireless connection, such as over network interface 1640.

As shown in FIG. 16, memory 1620 may include program instructions 1625, that implement the various embodiments of the systems as described herein, and data store 1635, comprising various data accessible by program instructions 1625, in one embodiment. In one embodiment, program instructions 1625 may include software elements of embodiments as described herein and as illustrated in the Figures. Data storage 1635 may include data that may be used in embodiments (e.g., data, tables, code, etc.). In other embodiments, other or different software elements and data may be included.

Those skilled in the art will appreciate that computer system 1600 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1600 may be transmitted to computer system 1600 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one origin server of a content delivery network, wherein the at least one origin server is configured to implement a plurality of databases with different respective schemas; and
   at least one edge server at an edge location of the content delivery network, wherein for individual clients of a plurality of clients of the content delivery network, a datastore engine of the at least one edge server is configured to:
   receive, from the client, a query for data;
   identify, based on the query, one of the plurality of the databases of the at least one origin server as a target database for the query;
   translate the query, based on the identified target database, from a format for the target database into a native format for an edge datastore at the edge location;
   determine, based on the translated query, whether the data exists at the edge datastore; and
   in response to a determination that the data does not exist at the edge datastore:
   send the received query to the target database at the at least one origin server;
   receive, from the target database, a response to the query in the format for the target database;
   parse the response, based on the identified target database, to obtain the data;
   store the data into the edge datastore; and
   send the response to the client.

2. The system as recited in claim 1, wherein the datastore engine is further configured to:
   in response to a determination that the data exists at the edge datastore:
   generate a response in the format for the target database, wherein the generated response includes the data; and
   send the generated response to the client.

3. The system as recited in claim 1, wherein the datastore engine is further configured to:
   receive, from the client, another query for a portion of the data, wherein the portion of the data comprises a smaller amount of data than the data;
   identify, based on the other query, the database as the target database for the other query;
   translate the other query, based on the identified target database, from the format for the target database into the native format for the datastore at the edge location;
   in response to a determination, based on the translated other query, that the portion of the data exists at the edge datastore:
   generate another response in the format for the target database, wherein the other response includes the portion of the data; and
   send the other response to the client.

4. The system as recited in claim 1, wherein the datastore engine is further configured to:
   receive, from the client, another query for other data;
   identify, based on the other query, another of the plurality of the databases as another target database for the other query;
   translate the other query, based on the identified other target database, from a format for the other target database into the native format for the edge datastore at the edge location;
   determine, based on the translated other query, whether the other data exists at the edge datastore; and
   in response to a determination that the other data does not exist at the edge datastore:
   send the received other query to the other target database at the at least one origin server;
   receive, from the other target database, a response to the other query in the format for the other target database;
   parse the response to the other query, based on the identified other target database, to obtain the other data;
   store the other data into the edge datastore; and
   send, to the client, the response to the other query.

5. The system as recited in claim 4, wherein the edge datastore engine is further configured to:
   in response to a determination that the other data exists at the edge datastore:
   generate another response in the format for the other target database, wherein the generated other response includes the other data; and
   send the generated other response to the client.

6. A method, comprising:
   performing, by one or more computing devices:
   receiving, from a client, at an edge server at an edge location of a content delivery network, a query for data;
   identify, based on the query, one of a plurality of databases as a target database for the query, wherein the plurality of databases are hosted by at least one origin server of the content delivery network and have different respective schemas;
   translate the query, based on the identified target database, from a format for the target database into a native format for an edge datastore at the edge location;
   determining, based on the translated query, whether the data exists at the edge datastore; and
   in response to determining that the data does not exist at the edge datastore:

sending the received query to the identified target database;
receive, from the database, a response to the query in the format for the identified target database;
parse the response, based on the identified target database, to obtain the data;
store the obtained data into the edge datastore; and
send the response to the client.

7. The method of claim 6, further comprising:
receiving, from the client, at the edge server, another query for the data;
identify, based on the other query, the database as the target database;
translating the other query, based on the identified target database, from the format for the target database into the native format for the edge datastore;
determining, based on the translated other query, whether the data exists at the edge datastore; and
in response to determining that the data exists at the edge datastore:
generating another response in the format for the target database, wherein the other response includes the data; and
sending the other response to the client.

8. The method of claim 7, wherein generating the other response in the format for the target database comprises:
determining, based on a time to live associated with the data at the edge datastore, whether the data is stale; and
in response to determining that the data is not stale, generating the other response.

9. The method of claim 6, wherein sending the received query to the identified target database comprises:
providing, to the target database, security credentials, wherein the security credentials are assigned to the client to authorize queries submitted to the target database on behalf of the client.

10. The method of claim 6, further comprising:
receiving, from the client, another query for other data;
identifying, based on the other query, the database as the target database for the other query;
translating the other query, based on the identified target database, from the format for the target database into the native format for the datastore at the edge location;
in response to determining, based on the translated other query, that the other data does not exist at the edge datastore:
sending the other query to the identified target database;
receive, from the target database, another response to the other query in the format for the identified database;
parse the other response, based on the identified target database, to obtain the other data;
store the obtained other data into the edge datastore; and
sending the other response to the client.

11. The method of claim 6, further comprising:
receiving, from the client, an additional query for at least a portion of the data and at least a portion of the other data;
identifying, based on the additional query, the database as the target database for the other query;
translating the additional query, based on the identified target database, from the format for the target database into the native format for the datastore at the edge location;
in response to determining, based on the translated additional query, that at least the portion of the data and at least the portion of the other data exists at the edge datastore:
generating another response in the format for the target database, wherein the other response includes at least the portion of the data and at least the portion of the other data; and
sending the other response to the client.

12. The method of claim 6, further comprising:
receiving, from the client, an indication to enable storing of data of the target database into edge datastores at edge locations; and
based on the indication to enable storing of data of the target database into edge datastores, configuring the edge location to store data for the target database into the edge datastore on behalf of the client.

13. The method of claim 6, further comprising:
receiving, from the client, another query for other data;
identifying, based on the other query, another of the plurality of the databases as a another target database for the other query;
determining, based on the identified other target database, whether the requested data is in the edge datastore;
in response to determining that the requested data is not in the edge datastore:
sending the other query to the other target database;
receiving, from the other target database, another response to the other query in the format for the other target database;
storing the other response and an associated cache key into the edge datastore; and
sending the other response to the client.

14. The method of claim 6, further comprising:
receiving, from the client, another query for other data;
identifying, based on the other query, another of the plurality of the databases as a target database for the other query;
translating the other query, based on the identified other target database, from a format for the other target database into the native format for the edge datastore;
determining, based on the translated other query, whether the other data exists at the edge datastore; and
in response to determining that the other data does not exist at the edge datastore:
sending the received other query to the other target database;
receiving, from the other target database, a response to the other query in the format for the other target database;
parsing the response to the other query, based on the identified other database, to obtain the other data;
storing the other data into the edge datastore; and
sending, to the client, the response to the other query.

15. One or more non-transitory computer-accessible storage media storing program instructions that when executed on or across one or more processors cause the one or more processors to:
receive, from a client at an edge server of a content delivery network, a query for data;
identify, based on the query, a database at an origin server as a target database for the query;
determine, based on the query and the identified target database, whether the data exists at an edge datastore at the edge server; and
in response to a determination that the data does not exist at the edge datastore:

send the received query to the target database at the origin server;
receive, from the target database, a response to the query in a format for the target database;
parse the response, based on the identified target database, to obtain the data; and
store the obtained data into the edge datastore.

16. The one or more storage media as recited in claim 15, wherein the program instructions when executed on or across the one or more processors cause the one or more processors to:
receive, from the client, another query for the data;
identify, based on the other query, the database as the target database;
determine, based on the other query and the identified target database, whether the data exists at the edge datastore; and
in response to a determination that the data exists at the edge datastore:
generate another response in the format for the target database, wherein the other response includes the data; and
send the other response to the client.

17. The one or more storage media as recited in claim 16, wherein the program instructions when executed on or across the one or more processors cause the one or more processors to:
determine, based on a time to live associated with the data at the edge datastore, whether the data is stale; and
in response to a determination that the data is not stale, generate the other response.

18. The one or more storage media as recited in claim 15, wherein the program instructions when executed on or across the one or more processors cause the one or more processors to:
receive, from the client, another query for a portion of the data, wherein the portion of the data comprises a smaller amount of data than the data;
identify, based on the other query, the database as the target database for the other query;
determine, based on the other query and the identified target database, whether the portion of the data exists at the edge datastore;
in response to a determination, based on the other query and the identified target database, that the portion of the data exists at the datastore:
generate another response in the format for the target database, wherein the other response includes the portion of the data; and
send the other response to the client.

19. The one or more storage media as recited in claim 15, wherein to send the received query to the target database at the origin server, the program instructions when executed on or across the one or more processors cause the one or more processors to:
provide, to the target database, security credentials, wherein the security credentials are assigned to the client to authorize queries submitted to the target database on behalf of the client.

20. The one or more storage media as recited in claim 15, wherein the program instructions when executed on or across the one or more processors cause the one or more processors to:
based on an indication from the client to enable storing of data of the target database into edge datastores, configure the edge location to store data for the database into the edge datastore on behalf of the client.

* * * * *